US006352734B1

(12) United States Patent
Martin, Jr. et al.

(10) Patent No.: US 6,352,734 B1
(45) Date of Patent: Mar. 5, 2002

(54) FROZEN DAIRY PRODUCTS AND METHODS OF PRODUCTION

(75) Inventors: Robert W. Martin, Jr., San Ramon; Nicole C. Brake, Union City, both of CA (US)

(73) Assignee: Dreyer's Grand Ice Cream, Inc., Oakland, CA (US)

( * ) Notice: Subject to any disclaimer, the term of this patent is extended or adjusted under 35 U.S.C. 154(b) by 0 days.

(21) Appl. No.: 09/257,665

(22) Filed: Feb. 25, 1999

(51) Int. Cl.$^7$ .............................. A23G 9/00; A23G 9/04
(52) U.S. Cl. ....................................................... 426/565
(58) Field of Search ................................ 426/565, 583, 426/586, 588

(56) References Cited

U.S. PATENT DOCUMENTS

| | | | |
|---|---|---|---|
| 3,615,718 A | * | 10/1971 | Weinstein |
| 3,896,716 A | * | 7/1975 | Carasso |
| 4,012,533 A | * | 3/1977 | Jonas |
| 4,145,454 A | * | 3/1979 | Dea et al. |
| 4,346,120 A | | 8/1982 | Morley et al. |
| 4,400,406 A | | 8/1983 | Morley et al. |
| 4,411,926 A | * | 10/1983 | Trumbetas et al. |
| 4,421,778 A | | 12/1983 | Kahn et al. |
| 4,427,701 A | * | 1/1984 | Morley |
| 4,452,823 A | * | 6/1984 | Connolly et al. |
| 4,452,824 A | * | 6/1984 | Cole et al. |
| 4,478,867 A | | 10/1984 | Zobel et al. |
| 4,840,813 A | | 6/1989 | Greenberg et al. |
| 4,851,239 A | * | 7/1989 | Amen et al. |
| 4,853,243 A | * | 8/1989 | Kahn et al. |
| 5,077,076 A | | 12/1991 | Gonsalves et al. |
| 5,082,682 A | * | 1/1992 | Peterson |
| 5,171,602 A | | 12/1992 | Martin et al. |
| 5,175,013 A | | 12/1992 | Huang et al. |
| 5,358,728 A | | 10/1994 | Martin et al. |
| 5,482,728 A | | 1/1996 | Tapfer et al. |
| 5,486,372 A | * | 1/1996 | Martin et al. |
| 5,690,983 A | | 11/1997 | Sponholtz |

FOREIGN PATENT DOCUMENTS

| | | | |
|---|---|---|---|
| GB | 1476309 | * | 8/1973 |
| WO | WO 97/30600 | | 8/1997 |

OTHER PUBLICATIONS

Arbuckle, "Ice Cream", third edition, pp. 34–56, 387–389. 392–393, 1977.*
Arbuckle, "Ice Cream", third edition, pp. 59–61, 80–93, 1977.*

* cited by examiner

Primary Examiner—Nina Bhat
(74) Attorney, Agent, or Firm—Dorr, Carson, Sloan & Birney, P.C.

(57) ABSTRACT

Frozen dairy products are provided that have an overrun of about 200% and that are soft and scoopable at about 0° F. to about 5° F. The frozen dairy products comprise from about 10% to about 13% of milk solids non-fat, from about 4% to about 16% of milk fat, from about 5% to about 10% of sucrose, from about 2% to about 8% of corn syrup having a DE of about 36, from about 4% to about 12% of dextrose, from about 0% to about 1.5% of starch, and from about 0.2% to about 1.0% of stabilizer, with the balance being water. The method of production for the frozen dairy products comprises the steps of heating water to a temperature from about 120° F. to about 130° F., agitating the water, adding to the heated water the sucrose, corn syrup, dextrose, starch, and stabilizer to form a first mixture, agitating the first mixture, adding the milk fat and the milk solids non-fat to the first mixture to form a final mixture, agitating the final mixture, pasteurizing and homogenizing the final mixture, aerating the final mixture to an overrun of about 200%, extruding and packaging the final mixture, and hardening the final mixture at about −30° F.

28 Claims, No Drawings

FROZEN DAIRY PRODUCTS AND METHODS OF PRODUCTION

BACKGROUND OF THE INVENTION

1. Field of the Invention

The present invention relates, in general, to frozen dairy products. More particularly, the present invention relates to formulations and methods for producing frozen dairy products for dessert use that have surprising stability, organoleptic, and body characteristics.

2. Statement of the Problem

Frozen dairy products enjoy great popularity. Many variations of frozen dairy products have been developed for dessert use, including ice cream, whipped toppings, and soft-serve products. Soft-serve products are particularly popular and have a wide appeal. Distinguishing features of conventional soft serve products are that they are frozen in a special soft-serve freezer, are dispensed by extrusion at carefully chosen subfreezing temperatures, and generally stand up on a cone or dish upon extrusion. Conventional soft-serve products are usually dispensed at an overrun on the order of 40% to 60%. Although soft-serve products of this character have been marketed for many years, they are still available only from stores having special freezers that dispense the product for immediate consumption. This is because the product generally is dispensed at temperatures between 16° F. and 24° F. At lower temperatures, the product is no longer sufficiently soft. Thus, conventional soft-serve products are not suited for sale from grocery store freezers for home storage and use. Home freezers maintain temperatures generally around 0° F. to 10° F., and store freezers, which as used herein includes grocery store, supermarket, and restaurant freezers, are generally at colder temperatures. Others have expended considerable effort to develop a soft-serve product for home use, but apparently with little success. A search of the prior art concerning such frozen dairy products discovered the following patents:

| | | |
|---|---|---|
| Rivière et al. | WO 97/30600 | Aug. 28, 1997 |
| Morley et al. | 4,346,120 | Aug. 24, 1982 |
| Morley et al. | 4,400,406 | Aug. 23, 1983 |
| Tapfer et al. | 5,482,728 | Jan. 9, 1996 |
| Sponholtz | 5,690,983 | Nov. 25, 1997 |
| Cole et al. | 4,452,824 | Jun. 5, 1984 |
| Zobel et al. | 4,478,867 | Oct. 23, 1984 |
| Gonsalves et al. | 5,077,076 | Dec. 31, 1991 |
| Martin et al. | 5,171,602 | Dec. 15, 1992 |
| Martin et al. | 5,358,728 | Oct. 25, 1994 |
| Kahn et al. | 4,421,778 | Dec. 20, 1983 |
| Greenberg et al. | 4,840,813 | Jun. 20, 1989 |

PCT Patent No. WO 97/30600 to Rivière et al. teaches a compound that is "spoonable" at −18° C. to −24° C. (−0.4° F. to −11.2° F.) and that contains 6 to 18 wt % milk proteins (as skim milk or dried milk powders), 6 to 24 wt % fat, 20.3 to 24.6 wt % carbohydrates (8.2 to 13.3 wt % dextrose, 3.3 to 8.2 wt % invert sugar, and 7.0 to 8.2 wt % glucose syrup), 0.25 to 0.8 wt % stabilizer, and 49 wt % liquid skim milk. The overrun is 50 to 200%. The Rivière patent relies on vegetable fat with a very low melting point, specifically sunflower oil, to achieve the softness or spoonability set forth. There is a further reliance on the use of emulsifiers (mono- and diglycerides) to provide the whipability, desirable texture, and shelf life characteristics of this frozen dessert.

U.S. Pat. Nos. 4,346,120 and 4,400,406 to Morley et al. teach a soft-serve compound. U.S. Pat. No. 4,346,120 shows a compound with 5 to 15 wt % milk solids non-fat (MSNF), 5 to 15 wt % fat, 20 to 40 wt % carbohydrates, 0.25 to 1.3 wt % stabilizer, 0.2 to 0.8 wt % emulsifier, and 43 to 65 wt % water. The overrun is between 110 and 220%. U.S. Pat. No. 4,400,406 is a continuation in part of the U.S. Pat. No. 4,346,120 patent that has different ranges: protein is between 3 and 7 wt %, fat is at 3 to 15 wt %, carbohydrates are at 18 to 30 wt %, stabilizer is at 0.35 to 1.0 wt %, water is at 43 to 65 wt %, and emulsifier is at 0.2 to 0.8 wt %. The overrun is between 100 and 220%. The Morley patent relies upon providing a saccharide system containing various sugars, a stabilizer system employing at least one stabilizer from each of at least three groups of stabilizers, and an emulsifier system having particular emulsifiers to provide an extrudable product at home freezer temperatures (0° F. to 10° F.). The carbohydrates used include fructose, sorbitol (a sugar alcohol), and corn syrup. The presence of the sorbitol is justified by a need to compensate for the excessive sugary taste imparted by the fructose.

U.S. Pat. No. 5,482,728 (to Tapfer et al.) teaches "hard" ice cream compositions containing 10 to 12.19 wt % MSNF, 5 to 14 wt % milk fat, 12.99 to 18.48 wt % carbohydrates as sugars encapsulated in fat, 0.29 to 0.34 wt % stabilizer/emulsifier, and 58.28 to 69.48 wt % water. The overrun is 50%. The key to the Tapfer et al. results is their method in which the sugar components are encapsulated in fat before use.

U.S. Pat. No. 5,690,983 (to Sponholtz) discloses an unfrozen expanded ice cream mix having 10.70 wt % MSNF, 8.00 wt % milk fat, 8.00 wt % sucrose, 7.0 wt % dextrose, 2.55 wt % stabilizer-emulsifier mix (Mixture TS-D 434), and 4.5 wt % flavor, for a total solids content of 42.75 wt %. The composition forms a liquid aerated mix with an overrun of 90% that can be stored at non-freezing temperatures.

U.S. Pat. No. 4,452,824 (to Cole et al.) teaches a soft-serve composition containing 2 to 10 wt % MSNF, 2 to 15 wt % milk fat, 24 to 34 wt % carbohydrates, 0 to 2 wt % stabilizer, 0.2 to 1.0 wt % emulsifier, and 45 to 65 wt % water. The carbohydrates are distributed in a critical combination so that the ratio of higher saccharides to mono- and disaccharides (ratio 1) and the ratio of disaccharides to monosaccharides (ratio 2) satisfy the relationship of $11 \leq (28 \times \text{ratio } 1) + \text{ratio } 2 \leq 28$. The overrun is 50 to 200%.

U.S. Pat. No. 4,478,867 (to Zobel et al.) teaches a process for whipping an emulsion. The emulsion contains 2 to 30 wt % nonfat dry milk, 18.0 to 30.0 wt % vegetable fat, 20.0 to 30.0 wt % carbohydrates, 0.01 to 2.0 wt % stabilizer, 0.5 to 2 wt % sodium caseinate, 0.4 to 2.0 wt % emulsifier, and 40 to 60 wt % water. The overrun is 200 to 350%. This emulsion has a texture similar to that of whipped cream (Cool Whip®).

U.S. Pat. No. 5,077,076 (to Gonsalves) teaches a formula for a whipped topping. The topping is comprised of 2.5 to 7.0 wt % MSNF, 5 to 15 wt % fat (either vegetable fat or milk fat), 15 to 25 wt % carbohydrates, 0.05 to 1.0 wt % stabilizer, 0.5 to 2 wt % sodium caseinate, 0.15 to 0.6 wt % emulsifier, 0.03 to 0.15 wt % phosphate salts, and 57 to 62 wt % water. The overrun is more than 250%. This topping also has a texture similar to that of whipped cream (Cool Whip®).

U.S. Pat. No. 5,171,602 (to Martin et al.) discloses a nonfat composition for a dessert product consisting of 8 to 18 wt % MSNF, 12 to 36 wt % carbohydrates, 0.5 to 3.0 wt % starch, and the balance being water. There is no fat, stabilizer, or emulsifier. The overrun is 80 to 100%.

U.S. Pat. No. 5,358,728 (to Martin et al.) is similar to U.S. Pat. No. 5,171,602, except that 0.03 to 0.3 wt % polyphosphate compounds are added.

U.S. Pat. No. 4,421,778 (to Kahn et al.) teaches compounds that contain a premix comprising 10 to 30 wt % fat, 3.5 to 20 wt % emulsifier, 6 to 34 wt % stabilizer, and the balance being a protein carrier, such as MSNF, dairy whey, whey protein, and/or a carbohydrate carrier. The basic composition is described as an oil-in-water emulsion of 3.00 wt % premix, 10.85 wt % protein, 24.00 wt % carbohydrates, 54.24 wt % water, 0.50 wt % flavor, and 7.41 wt % fat, of which at least 50% is a solid beta phase-tending crystalline fat (such as lauric fats, coconut oil, palm kernel oil, palm oil, etc.) that prevents the formation of crystalline surfaces. The overrun is 70 to 130%.

U.S. Pat. No. 4,840,813 (to Greenberg et al.) discloses a product having 4.0 to 7.2 wt % casein and 1 to 7 wt % whey. It is required by this patent to have a whey:casein ratio from 1:0.5 to 1:4. The product also includes 0.1 to 9.0 wt % fat, 14 to 18 wt % carbohydrates, 0.5 to 2 wt % ash, 0.1 to 5.0 wt % flavor, and 55 to 65 wt % water. The overrun is 40 to 100%.

In these prior formulations, it has been common to obtain a soft-serve type of product by the use of sugar alcohols, emulsifiers, vegetable fats, and other additives, all of which may add undesirable tastes or mouth sensations to the frozen dairy product. In other formulations, a soft-serve type of product has only been obtainable through the use of complex formulations and ratios of ingredients, or by complicated methods. To achieve different flavors or different types of products, additional ingredients must be added. None of the above references has provided a product having commercial success as a soft-serve ice cream type of product for home use.

SUMMARY OF THE INVENTION

The present invention is directed to frozen dairy products having desirable texture and that are soft and scoopable at home freezer temperatures (that is, at about 0° F. to about 5° F.) with unique organoleptic properties. The present invention also provides frozen dairy products that have a long shelf-life and that have an overrun of about 200%. In addition, the present invention provides for different embodiments of frozen dairy products, such as yogurt-like and custard-like. All of these characteristics are obtained by the present invention with simple and straightforward formulations that do not include sugar alcohols or vegetable fats. Further, emulsifiers may or may not be used, and preferably are not used in the present invention.

The frozen dairy product of the present invention is formulated with ingredients that provide fat, protein, water, sweeteners, and stabilizer constituents in a combination that permits the attainment of the desirable properties described above. The attainment with these ingredients of these properties is deemed unexpected and not predictable.

The frozen dairy product of the present invention preferably comprises, on a weight basis, about 10% to about 13% milk solids non-fat (MSNF), about 4% to about 16% milk fat, about 5% to about 10% sucrose, about 2% to about 8% corn syrup having a DE of about 36, about 4% to about 12% dextrose, about 0% to about 1.5% starch, and about 0.2% to about 1.0% stabilizer.

One particular feature of the frozen dairy products of the present invention is the ability to be aerated with significantly more air than is common for frozen dessert products. In the ice cream and soft serve industries, the amount of air in a product is described as "overrun." Overrun measures the percentage by which the volume of the liquid mix for a product is increased with air during whipping and freezing. The overrun of the frozen dairy product of the present invention is about 200%. It is unexpected for the formulation of this product to be able to attain such an overrun and produce a product with satisfactory shelf life/stability.

A method for production of the frozen dairy products is also provided by the present invention. In this method, a first mixture is prepared by adding the sucrose, corn syrup, dextrose, starch (if used), and stabilizer to heated water with agitation. The milk fat and milk solids non-fat are then added to the first mixture to form a final mixture. The final mixture is agitated for a time to thoroughly mix the ingredients. The final mixture is then pasteurized and homogenized. After these steps, the final mixture is aerated to an overrun of about 200% in a scrape surface heat exchanger, extruded, and packaged by conventional methods. The packaged mixture is then hardened for a predetermined period of time at −30° F. Unlike previous methods for producing frozen dessert products, there is no "mix maturation" step.

Accordingly, it is an object of the present invention to provide frozen dairy products having a desirable texture and unique organoleptic properties. It is another object of the present invention to provide frozen dairy products that are soft and scoopable at about 0° F. to about 5° F. It is an object of the present invention to provide frozen dairy products that can be produced in both regular and low-fat formulations and in a variety of product types without the addition of separate flavor ingredients. It is a further object of the present invention to provide methods for producing frozen dairy products.

These and other advantages, features, and objects of the present invention will be more readily understood in view of the following detailed description.

DETAILED DESCRIPTION OF THE INVENTION

The present invention provides frozen dairy products that are soft and scoopable at about 0° F. to about 5° F., have a stable through shelf-life, and incorporate a significant amount of air (up to about 200% overrun) while also having unique (creamy) organoleptic properties. Methods of production for the frozen dairy products are also disclosed herein. The frozen dairy products can be produced by the methods in a variety of embodiments, such as ice cream-like, low-fat ice cream-like, low-fat yogurt-like, and custard-like. Each of these embodiments can be further flavored, for example, with cocoa or other liquid flavor ingredients, or can support the addition of other edible materials, such as fruit, nuts, or candy pieces, for example.

Throughout the specification and claims, percentages and ratios are by weight and temperatures are in degrees Fahrenheit unless otherwise indicated.

The frozen dairy products of the present invention generally contain milk solids non-fat, milk fat, sucrose, corn syrup having a DE of about 36, dextrose, and stabilizer. In some embodiments, starch is present in the formulation. The amount and exact character of each ingredient will depend upon such factors as the character of the other ingredients and the desired nature of the end product. For example, the amount of fat is varied to provide regular and low-fat frozen dairy products. In one embodiment, a soft textured ice creamlike product is provided. In another embodiment, the milk solids non-fat are cultured with bacteria to a predetermined acidity, which provides a frozen yogurt-like product.

In a further embodiment, egg yolk is added to provide a frozen custard-like product.

In an important embodiment, the composition of the present invention that can be used to prepare frozen dairy products generally has the following components as set forth in Table I.

TABLE I

| Ingredient | Range (%) |
|---|---|
| Milk solids non-fat | 10–13 |
| Milk Fat | 4–16 |
| Sucrose | 5–10 |
| Corn syrup (about 36 DE) | 2–8 |
| Dextrose | 4–12 |
| Starch | 0–1.5 |
| Stabilizer | 0.2–1.0 |
| Water | q.s. |

Milk solids non-fat as used in the preferred compositions of this invention can be derived from cream, milk (including condensed milk, skim milk, and condensed skim milk), and non-fat dry milk. Milk solids non-fat aid in providing the desirable properties of whipability, smoothness, body, mouthfeel, and melt resistance.

The milk fat ingredient aids in providing a creamy taste and the eating characteristics associated with ice cream-like products. It also contributes to the smoothness, the body, and the melting resistance of the frozen dairy products. Dairy cream and milk are the preferred fat sources.

The sweetener ingredients preferably are a combination of sucrose, dextrose, and corn syrup that provide a desired level of sweetness and texture to the frozen dairy products. The combination of dextrose, sucrose, and corn syrup also serves to decrease the freezing point of the mixture. It is postulated that the freezing point depression decreases viscosity, thus allowing for uniform and stable incorporation of air. The corn syrup preferably has a dextrose equivalent (DE) of about 36, which is in the low DE range of corn syrups. Corn syrups possessing a DE of about 24 to about 42 can be used in this invention. Corn syrup of 36 DE is preferred for ease of processability and satisfactory low-molecular-weight sugar composition. In addition, high-fructose corn syrup can be used.

The stabilizer ingredient may also contribute to the attainment of the desired features of the new frozen dairy products. The stabilizer ingredient is used to improve the ability of the products to withstand commercial shelf life and substantial heat shock without undue deterioration, such as a loss of overrun. The stabilizer ingredient may include vegetable gums and, in a preferred embodiment, the stabilizer ingredient is selected from the group consisting of locust bean gum, guar gum, and carrageenan. Other stabilizers may be appropriate for use in the present invention, and such stabilizers will be evident to those skilled in the art and are meant to be included in this description of the frozen dairy products.

Water is present in the new frozen dairy products as a dispersion medium for the other ingredients of the emulsified product. The portion of water in the product is determined on an "as needed" (q.s.) basis to provide the balance of the mixture with reference to a total weight of 100% after the weights of the other ingredients are taken into account. The portion of water in the products that remains unfrozen provides fluidity for the product. The portion of water that does freeze forms ice crystals that give the product rigidity as well as the refreshing taste perception characteristic of a frozen dessert.

A flavor ingredient can be added to these ingredients if desired. The flavor ingredient is selected from known flavors according to the desired taste, taking into account the other ingredients. Flavor ingredients include, by way of illustration, liquid flavor ingredients such as vanilla, vanilla extract, cocoa, and mint, and solid flavor ingredients such as fruits, nuts, candy, chocolate- and peanut-flavored chips and the like, as well as other flavor ingredients. The present invention provides frozen dairy products with a stable matrix that will hold unexpectedly large amounts of such flavor ingredients. For example, cocoa is added at up to about 3.5% to provide a chocolate flavor. Fruit and nuts can be added from about 0% to about 40% usage by weight. Note, however, that the ingredient ranges specified herein, unless stated otherwise, are for an unflavored product. Those skilled in the art will comprehend the adjustments appropriate for the particular flavor ingredient used. Of importance to the present invention, different embodiments of the frozen dairy products exist that are not dependent on the addition of flavor ingredients, such as yogurt-like or custard-like products (see examples below).

In addition to the foregoing ingredients, the frozen dairy products of the present invention can include other ingredients if desired, such as, for example, starches. If starches are used in the formulations of the present invention, any modified food starch, such as, for example, corn starch, potato starch, rice starch, or tapioca starch, can be used. The starch used in the compositions of the present invention is preferably modified corn starch. Modified starches, when used at low levels (less than about 2%), offer improved texture (creaminess) and improved shelf-life (stability) to the frozen dairy products. It is thought that starch molecules organize water in fashion similar to that of hydrocolloid (stabilizer) molecules by obstructing ice crystal growth and/or changing the morphology of ice crystals. In addition, starch may enhance the whipability and air incorporation in the frozen dairy products by strengthening the solids matrix surrounding the air cells.

In order to achieve the frozen dairy products of the present invention, a particular method is preferably used. In a preferred method of the present invention, the water required is added to a kettle provided with an agitating device. The preferred agitating device is a Lanco/Breddo™ high shear mixer/liquefier that is preferably operated at its highest speed. The water is heated to a temperature of from about 120° F. to about 130° F.

The order of addition of the individual ingredients is important to obtain uniform blending of the ingredients. The following order of addition is preferred. The sucrose, corn syrup, dextrose, stabilizer, and starch (if present) are added to the heated water, and agitation is commenced and continued for a period of from about 30 seconds to about 4 minutes, preferably about 2 minutes, to form a first mixture. The milk fat and milk solids non-fat are then added and agitation is continued for an additional about 30 seconds to about 4 minutes, preferably about 2 minutes, to form a final mixture.

The final mixture is then pasteurized under suitable time and temperature conditions, preferably at a temperature of from about 180° F. to about 200° F. for a hold time of about 30 to about 120 seconds, followed by regeneration and cooling to about 40° F. In another embodiment, the final mixture is pasteurized by vat between about 165° F. to about 170° F. for about 30 minutes, followed by similar regeneration and cooling to about 40° F.

The pasteurized final mixture is then homogenized in a conventional two-stage homogenizer. In a preferred embodiment, homogenization comprises a first stage performed at a pressure of about 500 psi to about 1,500 psi and a second stage following the first stage, with the second stage performed at about 2,000 psi to about 5,000 psi.

After pasteurization and homogenization, the final mixture is flavored, aerated in a scrape surface heat exchanger, extruded, and packaged by conventional methods. The aerated final mixture has an overrun of about 200%. The packaged mixture is then hardened at about −30° F. for about 6 hours to about 18 hours before distribution.

Once the frozen dairy products are prepared by the above method, they can be stored for about 2 weeks to about 4 weeks at either store freezer or home freezer temperatures and also resist considerable temperature variations, such as that which occurs between the time the product is purchased from a store until the product is placed in a home freezer, without significant loss of their desirable properties.

Of importance to the present invention, the desired properties of a soft texture that is scoopable at about 0° F. to about 5° F., unique organoleptic properties, a stable shelf-life, and the ability to hold an overrun of about 200% are obtained in the frozen dairy products of this invention with the use of the above-described ingredients in a straightforward combination and method of production. These results are deemed unexpected and advantageous, in that other ingredients such as emulsifiers, complex ratios of ingredients, and additional, time-consuming steps, such as a mix maturation step in which the product is held at a predetermined temperature for up to 24 hours before freezing, have generally been necessary in previous frozen products in order to achieve some of these desirable results.

The individual ingredients comprising the compositions of the invention may be varied in quantity to obtain embodiments of frozen dairy products having different flavor and textural sensations without the use of additional flavor and textural ingredients as described above. The following examples further illustrate various features of the present invention that are intended to in no way limit the scope of the invention that is defined in the appended claims.

EXAMPLE 1

A batch of frozen dairy product was made by the above-described method using the following components at the indicated levels:

| Ingredient | Range (%) |
|---|---|
| Milk solids non-fat | 10–13 |
| Milk fat | 5–16 |
| Sucrose | 5–8 |
| Corn syrup (about 36 DE) | 3–6 |
| Dextrose | 5–9 |
| Starch | 0–1.5 |
| Stabilizer | 0.2–1.0 |
| Water | q.s. |

In this example, the resulting frozen dairy product has a soft texture and a taste similar to that of ice cream. If desired, cocoa or other liquid flavor ingredients can be added at up to 3.5% as described above.

EXAMPLE 2

In this example, the frozen dairy product has a soft texture and a taste similar to that of a frozen yogurt. This embodiment is also low in fat.

| Ingredients | Range (%) |
|---|---|
| Milk solids non-fat | 10–13 |
| Milk fat | 5–10 |
| Sucrose | 5–10 |
| Corn syrup (about 36 DE) | 4–8 |
| Dextrose | 4–12 |
| Starch | 0.5–1.5 |
| Stabilizer | 0.65–1.0 |
| Water | q.s. |

In the method for producing the frozen dairy product of Example 2, a portion of the ingredients is first cultured with bacteria to provide the yogurt-like product of this embodiment. That is, in this particular method, a culture mixture is first prepared by heating water to a temperature of about 120° F. to about 130° F. and adding a portion of the milk solids non-fat, that is, about 5% to about 10% of the total milk solids non-fat, to the heated water to form a first mixture. This first mixture is then pasteurized and cooled to about 110° F. Bacteria are then added with agitation for about 30 minutes. The first mixture with the bacteria is then incubated at about 110° F. for about 2 hours to about 6 hours until it reaches about 1.10 titratable acidity. Titratable acidity is defined as percent acid (by weight) in a given sample.

The bacteria used for culturing the culture mix are selected from the group consisting of *Lactobacillus acidophilus, Bifidobacterium longum, Streptococcus salivarius* subsp. *thermophilus*, and *Lactobacillus delbruckii* subsp. *bulgaricus*. Other species of bacteria capable of culturing the culture mix may be known to those skilled in the art and are meant to be included in the present invention.

In the next step, a sugar mixture is prepared by heating water between about 120° F. and about 130° F. and adding the remainder of the milk solids non-fat, milk fat, sucrose, corn syrup, dextrose, starch, and stabilizer to the heated water with agitation to form a second mixture. The second mixture is then pasteurized as described above.

The culture mixture having a titratable acidity of about 1.10 is then blended with the sugar mixture to form a final mixture. Preferably, the culture mixture is blended with the sugar mixture in a 32.5%/67.5% volume/volume ratio, but other ratios can be used under the present invention as will be known to those skilled in the art. The final mixture is then aerated in a scrape surface heat exchanger, extruded, packaged, and hardened at about −30° F. as described above to provide a frozen yogurt-like product. As for Example 1, flavor ingredients can be added to the final mixture to provide desired flavors for the yogurt-like frozen dairy product.

EXAMPLE 3

In this embodiment of the present invention, the frozen dairy product is similar to a low-fat ice cream with a soft texture.

| Ingredients | Range (%) |
|---|---|
| Milk solids non-fat | 10–13 |
| Milk fat | 5–10 |
| Sucrose | 5–10 |
| Corn syrup (about 36 DE) | 2–4 |
| Dextrose | 4–10 |

-continued

| Ingredients | Range (%) |
| --- | --- |
| Starch | 0.5–0.75 |
| Stabilizer | 0.65–1.0 |
| Water | q.s. |

In this embodiment, the method of Example 1 is used to prepare the product. Flavor ingredients can be added if desired.

EXAMPLE 4

In this embodiment, the frozen dairy product has a soft texture, is low in fat, and resembles a custard-like product.

| Ingredients | Range (%) |
| --- | --- |
| Milk solids non-fat | 10–13 |
| Milk fat | 4–10 |
| Sucrose | 5–7 |
| Corn syrup (about 36 DE) | 2–6 |
| Dextrose | 4–10 |
| Starch | 0.65–1.0 |
| Stabilizer | 0.65–1.0 |
| Egg yolk | 1.4–2.0 |
| Water | q.s. |

In the method for this embodiment, the egg yolk is added to the heated water along with the sweeteners, stabilizer, and starch (if present) and agitated for about 30 seconds to about 4 minutes, preferably for about 2 minutes, in order to combine the egg yolk thoroughly before pasteurization. As before, flavoring ingredients can be added if desired.

Thus, the present invention provides for frozen dairy products having desirable textural and unique organoleptic properties, such as being soft and scoopable at about 0° F. to about 5° F., being capable of being aerated to an overrun of about 200%, providing a variety of embodiments, such as ice cream like, yogurt-like, and custard-like, and maintaining these desirable properties during a long shelf life. These results are unexpected when using the ingredients and methods specified herein.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

We claim:

1. A frozen dairy product comprising on a weight basis:
from about 10% to about 13% of milk solids non-fat;
from about 4% to about 16% of milk fat;
from about 5% to about 10% of sucrose;
from about 2% to about 8% of corn syrup having a DE of about 36;
from about 4% to about 12% of dextrose;
from about 0% to about 1.5% of starch; and
from 0.2% to 1.0% of stabilizer, with the balance being water; wherein said frozen dairy product is produced by a method comprising the steps of: heating water to a temperature from about 120 degrees F to about 130 degrees F; adding said water said sucrose, corn syrup, dextrose, starch and stabilizer to form a first mixture; agitating said first mixture; adding to said first mixture said milk solids non-fat and milk fat to from a final mixture; agitating said final mixture; pasteurizing and homogenizing said final mixture; aerating, extruding, and packaging said final mixture and hardening said final mixture at about −30 degrees F.

2. The frozen dairy product of claim 1 wherein said frozen dairy product has an overrun of about 200%.

3. The frozen dairy product of claim 1 wherein said frozen dairy product is soft and scoopable at temperatures from about 0° F. to about 5° F.

4. The frozen dairy product of claim 1 wherein said stabilizer is selected from the group consisting of locust bean gum, guar gum, and carrageenan.

5. The frozen dairy product of claim 1 wherein said starch is a modified starch.

6. The frozen dairy product of claim 1 further comprising from about 0% to about 3.5% of a liquid flavor ingredient.

7. The frozen dairy product of claim 1 wherein said milk solids non-fat are present in an amount from about 10% to about 13%, said milk fat is present in an amount from about 5% to about 10%, said sucrose is present in an amount from about 5% to about 10%, said corn syrup is present in an amount from about 2% to about 4%, said dextrose is present in an amount from about 4% to about 10%, said starch is present in an amount from about 0.5% to about 0.75%, and said stabilizer is present in an amount from about 0.65% to about 1.0%, with the balance being water.

8. The frozen dairy product of claim 7 wherein a portion of said milk solids non-fat are cultured with bacteria.

9. The frozen dairy product of claim 8 wherein said bacteria are selected from the group consisting of *Lactobacillus acidophilus, Bifidobacterium longum, Streptococcus salivarius* subsp. *thermophilus*, and *Lactobacillus delbruckii* subsp. *bulgaricus*.

10. The frozen dairy product of claim 1 wherein said milk solids non-fat are present in an amount from about 10% to about 13%, said milk fat is present in an amount from about 5% to about 10%, said sucrose is present in an amount from about 5% to about 10%, said corn syrup is present in an amount from about 4% to about 8%, said dextrose is present in an amount from about 4% to about 12%, said starch is present in an amount from about 0.5% to about 1.5%, and said stabilizer is present in an amount from about 0.65% to about 1.0%, with the balance being water.

11. The method of claim 1 wherein said pasteurizing step comprises:
heating said final mixture between about 180° F. and about 200° F. with a hold time of about 30 seconds to about 120 seconds;
regenerating; and
cooling to 40° F.

12. The method of claim 1 wherein said pasteurizing step comprises:
heating said final mixture between about 165° F. and about 170° F. for about 30 minutes;
regenerating; and
cooling to 40° F.

13. The method of claim 1 wherein said homogenizing step comprises:
   a first stage performed at about 500 psi to about 1,500 psi; and
   a second stage following said first stage, said second stage performed at about 2,000 psi to about 5,000 psi.

14. The method of claim 1 wherein said aerating step produces an overrun of about 200%.

15. The method of claim 1 wherein said frozen dairy product is soft and scoopable from about 0° F. to about 5° F.

16. The method of claim 1 wherein said stabilizer is selected from the group consisting of locust bean gum, guar gum, and carrageenan.

17. The method of claim 1 wherein said starch is a modified starch.

18. The method of claim 1 further comprising the step of adding from about 0% to about 3.5% of a liquid flavor ingredient to said final mixture.

19. The method of claim 1 wherein said final mixture comprises on a weight basis:
   from about 10% to about 13% of said milk solids non-fat;
   from about 4% to about 16% of said milk fat;
   from about 5% to about 10% of said sucrose;
   from about 2% to about 8% of said corn syrup;
   from about 4% to about 12% of said dextrose;
   from about 0% to about 1.5% of said starch; and
   from about 0.2% to about 1.0% of said stabilizer, with the balance being said water.

20. The method of claim 19 wherein said final mixture comprises:
   from about 10% to about 13% of said milk solids non-fat;
   from about 5% to about 16% of said milk fat;
   from about 5% to about 8% of said sucrose;
   from about 3% to about 6% of said corn syrup;
   from about 5% to about 9% of said dextrose;
   from about 0% to about 1.5% of said starch; and
   from about 0.2% to about 1.0% of said stabilizer, with the balance being said water.

21. The method of claim 19 wherein said final mixture comprises:
   from about 10% to about 13% of said milk solids non-fat;
   from about 5% to about 10% of said milk fat;
   from about 5% to about 10% of said sucrose;
   from about 2% to about 4% of said corn syrup;
   from about 4% to about 10% of said dextrose;
   from about 0.5% to about 0.75% of said starch; and
   from about 0.65% to about 1.0% of said stabilizer, with the balance being said water.

22. The method of claim 19 further comprising the step of adding egg yolk to said first mixture.

23. The method of claim 22 wherein said final mixture comprises:
   from about 10% to about 13% of said milk solids non-fat;
   from about 4% to about 10% of said milk fat;
   from about 5% to about 7% of said sucrose;
   from about 2% to about 6% of said corn syrup;
   from about 4% to about 10% of said dextrose;
   from about 0.65% to about 1.0% of said starch;
   from about 0.65% to about 1.0% of said stabilizer; and
   from about 1.4% to about 2.0% of said egg yolk, with the balance being said water.

24. A method for producing a frozen dairy product comprising the steps of:
   heating water to a temperature from about 120° F. to about 130° F.;
   agitating said water;
   adding to said water sucrose, corn syrup having a DE of about 36, dextrose, starch, and stabilizer to form a first mixture;
   agitating said first mixture;
   adding to said first mixture milk solids non-fat and milk fat to form a final mixture;
   agitating said final mixture;
   pasteurizing and homogenizing said final mixture, said homogenizing step having a first stage performed at about 500 psi to about 1,500 psi and a second stage following said first stage, said second stage performed at about 2,000 psi to about 5,000 psi;
   aerating, extruding, and packaging said final mixture, said aerating step providing an overrun of about 200%; and
   hardening said final mixture at about −30° F.

25. The method of claim 24 wherein said pasteurizing step comprises:
   heating said final mixture between about 180° F. and about 200° F. with a hold time of about 30 seconds to about 120 seconds;
   regenerating; and
   cooling to 40° F.

26. The method of claim 24 wherein said pasteurizing step comprises:
   heating said final mixture between about 165° F. and about 170° F. for about 30 minutes;
   regenerating; and
   cooling to 40° F.

27. A frozen dairy product comprising on a weight basis;
   from about 10% to about 13% of milk solids non-fat;
   from about 5% to about 16% of milk fat;
   from about 5% to about 8% of sucrose;
   from about 3% to about 6% of corn syrup having a DE of about 36;
   from about 5% to about 9% of dextrose;
   from about 0% to about 1.5% Of starch; and from about 0.2% to about 1.0% of stabilizer, with the balance being water.

28. A frozen dairy product comprising on a weight basis:
   from about 10% to about 13% of milk solids non-fat;
   from about 4% to about 10% of milk fat;
   from about 5% to about 7% of sucrose;
   from about 2% to about 6% of corn syrup having a DE of about 36;
   from about 4%1 to about 10% of dextrose;
   from about 0.65% to about 1.0% of starch; and
   from about 0.65% to about 1.0% of stabilizer, and
   from about 1.4% to about 2.0% of egg yolk, with the balance being water.

* * * * *